United States Patent
Abthoff et al.

(10) Patent No.: US 6,295,817 B1
(45) Date of Patent: Oct. 2, 2001

(54) DRIVE ASSEMBLY FOR A VEHICLE

(75) Inventors: Joerg Abthoff, Pluederhausen; Ruediger Pfaff, Stuttgart; Joachim Wiltschka, Fellbach, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/390,660

(22) Filed: Sep. 7, 1999

(30) Foreign Application Priority Data

Sep. 5, 1998 (DE) .............................................. 198 40 629

(51) Int. Cl.⁷ ...................................................... F02B 33/44
(52) U.S. Cl. ................................... 60/612; 60/280; 60/295
(58) Field of Search .......................... 60/612, 280, 295, 60/306

(56) References Cited

U.S. PATENT DOCUMENTS

| | | |
|---|---|---|
| 3,673,797 | 7/1972 | Wilkinson . |
| 4,437,311 * | 3/1984 | Iwamoto et al. ........................ 60/280 |
| 4,444,012 * | 4/1984 | Gauffres .................................. 60/280 |
| 5,105,620 * | 4/1992 | Matsumura ............................. 60/280 |
| 5,207,063 * | 5/1993 | Blake ..................................... 60/612 |

FOREIGN PATENT DOCUMENTS

| | | |
|---|---|---|
| 616207 | 3/1980 | (CH) . |
| P1 526455 | 2/1970 | (DE) . |
| 2 017 496 | 1/1971 | (DE) . |
| OS 2533255 | 2/1977 | (DE) . |
| 3100732 A1 | 7/1982 | (DE) . |
| 4041628 | 7/1992 | (DE) . |
| 4106684 | 9/1992 | (DE) . |
| P2 207221 | 9/1993 | (DE) . |
| 19533333 | 3/1997 | (DE) . |
| 231 223 | 11/1988 | (EP) . |
| 2121105 | 12/1983 | (GB) . |
| 2 186 023 | 8/1987 | (GB) ...................................... 60/612 |
| 6-229250 | 8/1994 | (JP) . |
| WO 92/04536 | 5/1991 | (WO) . |

OTHER PUBLICATIONS

Copy of Office Action from German Patent Office dated Jan. 19, 2000.
Watson/Janota: Turbocharging the Internal Combustion Engine, The MacMillan Press Ltd., London (u.a.), 1982 S. 392.

* cited by examiner

Primary Examiner—Thomas Denion
Assistant Examiner—Thai-Ba Trieu
(74) Attorney, Agent, or Firm—Crowell & Moring, L.L.P.

(57) ABSTRACT

A drive assembly for a vehicle with an internal-combustion engine for supplying driving energy, has an exhaust gas turbocharger which has a turbine and a compressor. The turbine is driven by exhaust gases of the internal-combustion engine, and the compressor is driven by the turbine. An air guiding system supplies fresh air to the compressor, in which the fresh air is compressed to form charge air. The air guiding system guides the charge air from the compressor to the internal-combustion engine, and the power of the internal-combustion engine is to be increased at low rotational speeds by an additional compressor which generates compressed fresh air which, as a function of the requirements, can be supplied to the air guiding system upstream of the internal-combustion engine. As the additional compressor, a compressor is used which is already present in the vehicle for other purposes.

19 Claims, 1 Drawing Sheet

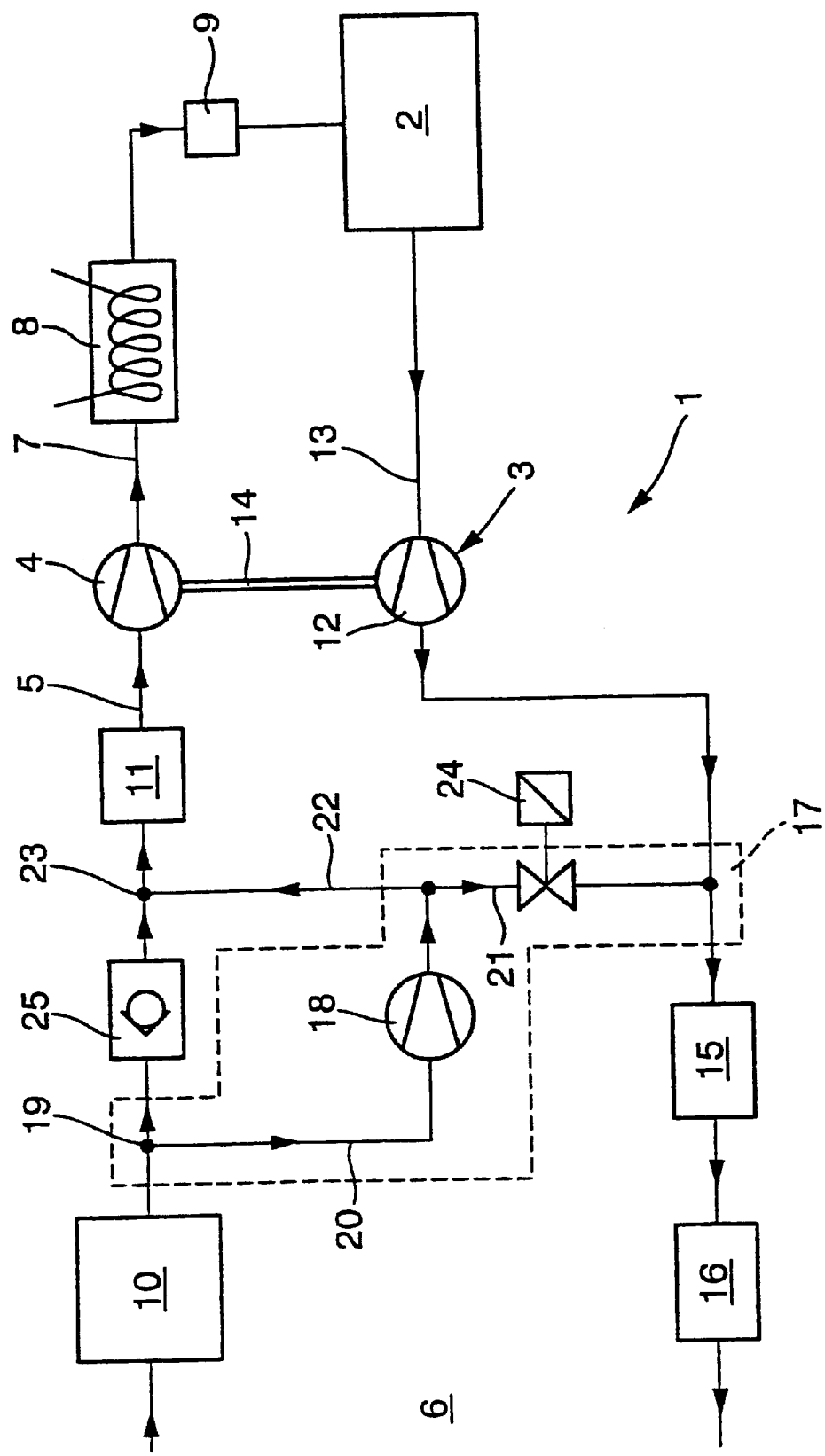

DRIVE ASSEMBLY FOR A VEHICLE

BACKGROUND OF THE INVENTION

This application claims the priority of 198 40 629.0–13, filed Sep. 5, 1998, the disclosure of which is expressly incorporated by reference herein.

The present invention relates to a drive assembly for a vehicle having an internal-combustion engine for delivering driving energy, an exhaust gas turbocharger which has a turbine and a compressor, with the turbine being driven by exhaust gases of the internal-combustion engine and the compressor being driven by the turbine, and an air guiding system which feeds fresh air to the compressor in which it is compressed to form charge air. The air guiding system guides the charge air from the compressor to the internal-combustion engine.

In known drive assemblies, an exhaust gas turbocharger is normally used for increasing the power of an internal-combustion engine. This exhaust gas turbocharger has a turbine driven by exhaust gases of the internal-combustion engine and a compressor driven by the turbine. Fresh air, which is normally taken in from the atmospheric environment of the vehicle via an air filter, is compressed to form charge air which is then supplied from a compressor to the internal-combustion engine for the combustion. As the result of the compression, a larger flow rate is obtained which permits an increase of the power of the internal-combustion engine.

Because the exhaust gas turbocharger of a drive assembly is normally designed for the full-load operation at high rotational engine speeds, the exhaust gas turbocharger can cause only a relatively low compression of the fresh air at low rotational engine speeds. In such a low rotational speed range of the internal-combustion engine, a power increase can hardly be achieved with the exhaust gas turbocharger. The compressor will generate a sufficient supercharging only at higher rotational speeds. By way of the increased air flow rate and the correspondingly enlarged fuel flow rate, this supercharging causes, on one hand, a power increase of the internal-combustion engine and, on the other hand, an increased exhaust gas temperature and a raised exhaust gas pressure, whereby the power output of the turbine is considerably increased. Because of this feedback, the internal-combustion engine can rapidly supply a high power as soon as the turbocharger "responds"; i.e., as soon as a sufficient supercharging takes place by the compressor. Normally, a so-called "turbohole" exists at low rotational speeds until the turbocharger responds.

In order to improve the efficiency of a supercharged internal-combustion engine also in the range of low rotational speeds, a large number of different suggestions have been made.

For example, U.S. Pat. No. 3,673,797 describes a drive assembly in which the driving power of an internal-combustion engine is increased by a turbine driven by the exhaust gases of the internal-combustion engine. The turbine feeds its driving power into a differential gearing which interacts with the transmission line of the internal-combustion engine. In this manner, the driving power of the internal-combustion engine is increased directly by the driving power of the turbine. This turbine also has, however, a turbohole at low rotational speeds of the internal-combustion engine.

In addition, in this drive assembly, a second differential gearing is arranged in the transmission line driven by the internal-combustion engine and the turbine. By way of the second differential gearing, a compressor is driven which compresses fresh air and feeds it as charge air to the internal-combustion engine. The compressor, which is mechanically driven in this manner, therefore indirectly also increases the driving power of the internal-combustion engine. Such a mechanically driven compressor has no very pronounced turbohole like that associated with an exhaust gas turbocharger so that, also at lower rotational speeds, a power increase can be achieved here by supercharging the engine.

Furthermore, the known drive assembly has another compressor which is driven by the turbine and compresses fresh air which is then supplied either in series to the other compressor or in parallel thereto to the internal-combustion engine. A drive assembly constructed in this manner can be implemented only at very high expenditures.

SUMMARY OF THE INVENTION

An object of the present invention is to overcome the problems associated with the known drive assembly in a constructively simple manner such that the efficiency of an associated internal-combustion engine is increased in the low rotational speed range.

According to the invention, this object has been achieved by a drive assembly in which an additional compressor is provided to generate compressed fresh air which, as a function of the requirements, can be fed to the air guiding system upstream of the internal-combustion engine. A compressor which already exists in the vehicle for different purposes can be used as the additional compressor.

The invention is based on the recognition of the advantages of using an air compression device already contained in the vehicle for basically any purpose, such as a compressor or a blower, for increasing the pressure level of the air supplied to the internal-combustion engine for the combustion.

By way of the measure suggested according to the present invention, with existing drive assemblies, only constructively simple changes have to be made which, in addition, can be carried out in a low-cost and simple manner to arrive at the drive assembly according to the invention.

The invention utilizes the recognition that even a relatively low rise of the pressure level of the fresh air supplied to the internal-combustion engine is sufficient for causing a response of the turbocharger at low rotational speeds. The reason is that even a slightly raised pressure results in an increased rate of air flow and thus in an increased fuel supply, whereby the exhaust gas temperature and the exhaust gas pressure and thus the exhaust gas enthalpy are increased so that the turbine can immediately transmit more power to the compressor. This feedback will then rapidly build up so that the exhaust gas turbocharger will respond. In this manner, the turbohole is shifted to lower rotational speeds, in the direction of an idling speed.

Corresponding to an advantageous embodiment, the compressed fresh air generated by the additional compressor is fed into the air guiding system in front of the compressor so that a raised pressure level is already supplied to the compressor. This has the result that the pressure raise caused by the additional compressor does not have an additive but a multiplicative effect on the charge air pressure generated by the compressor. Thereby, the exhaust gas turbocharger responds at still lower rotational speeds.

According to the invention, the use of any compression device which is already contained for another purpose in the vehicle is usable for generating compressed fresh air. Such compression devices are, for example, a compressed-air pump of a level control system, a compressed-air pump of a pneumatic spring system and the like. The use of such an air compression device already existing in the vehicle is, among other reasons, also possible because, on one hand, only a slight raising of the pressure level is required for achieving the desired effect. On the other hand, the above-mentioned air compression devices are typically not required by the pertaining vehicle systems (such as the level control system, the pneumatic spring system, etc.) in operating phases in which a power increase is to be achieved by way of these air compression devices. In addition, such pneumatic systems of the vehicle normally have compressed-air storage devices so that the pertaining air compression device can also take over a different function in the vehicle for a short time.

Corresponding to a particularly advantageous embodiment of the drive assembly according to the invention, a secondary air compressor is used for the precompression. This secondary air compressor is used in the case of an internal-combustion engine constructed as an Otto engine particularly during a warm-up phase for enriching the exhaust gases with oxygen in order to achieve, in the oxidation catalyst, an afterburning of the fuel constituents still contained in the exhaust gases or an oxidation of the CO- and HC-constituents of the exhaust gases. This afterburning or afteroxidation of the exhaust gases is carried out in the case of Otto engines preferably during the warm-up phase, in which the Otto engine is normally operated with a fuel excess, for reducing the pollutant emission. When the engine is warmed up, the secondary air compressor is normally no longer required for afterburning, so that it can be used without any limitation for precompressing the fresh air at low rotational speeds. By virtue of a corresponding control, in the case of mutually overlapping operating phases, i.e., when a full load is required at low rotational speeds during the warm-up phase of the internal-combustion engine, priority can be given either to the low pollutant emission or to the higher engine power.

BRIEF DESCRIPTION OF THE DRAWINGS

Other objects, advantages and novel features of the present invention will become apparent from the following detailed description of the invention when considered in conjunction with the accompanying drawings.

The sole FIGURE is a schematic diagram of a drive assembly according to the present invention.

DETAILED DESCRIPTION OF THE DRAWINGS

In the illustrated preferred embodiment, a drive assembly 1 according to the invention has an internal-combustion engine 2 constructed as an Otto engine which is supercharged by an exhaust turbocharger 3 for the purpose of increasing power. The exhaust gas turbocharger 3 has a compressor 4 to which fresh air is supplied which is taken in by way of a fresh-air pipe 5 from the environment 6 of a vehicle. At higher rotational speeds of the internal-combustion engine 2, the compressor 4 compresses the fresh air to form charge air which is supplied to the internal-combustion engine 2 by way of a charge air pipe 7.

A charge air cooler 8 is arranged in the charge air pipe 7. Thermal energy is withdrawn in the charge air cooler 8 from the charge air heated by the compression in the compressor 4 in order to additionally increase in this manner the rate of the air flow supplied to the internal-combustion engine 2. A throttle valve 9 is arranged in the charge air pipe 7 in front of the inlet of the cooled charge air into the internal-combustion engine 2. The throttle valve 9 throttles the charge air in the operating points of the internal-combustion engine 2 in which the full power increase by way of the charge air supercharging is not required.

Upstream of the compressor 4, an air filter 10 through which fresh air flows is first arranged in the fresh-air pipe 5. Furthermore, an air flow rate measuring element 11 is arranged in the fresh-air pipe 5 in front of the compressor 4. An air flow rate measuring element 11 of this type may be constructed, for example, as a so-called hot-film meter and is used for determining the required fuel flow rate which is supplied to the internal-combustion engine 2 by way of a conventional fuel injection system for the combustion. The illustrated drive assembly therefore operates with the air flow rate as the command variable for controlling the internal-combustion engine.

In addition, the exhaust gas turbocharger 3 has a turbine 12 which is arranged in an exhaust pipe 13 and is driven by exhaust gases of the internal-combustion engine 2. The turbine 12 is coupled with the compressor 4 by way of a drive shaft 14 whereby the compressor 4 is driven by the turbine 12.

A conventionally-operating catalyst 15 is arranged in the exhaust pipe 13 downstream of the turbine 12 and causes a reduction of the pollutant emission of the internal-combustion engine 2. A sound absorber 16 is arranged in the exhaust pipe 13 downstream of the catalyst 15 in order to reduce, also in a conventional manner, the sound emissions and thus the noise generation of the drive assembly 1 or its internal-combustion engine 2.

In addition, the drive assembly 1 according to the invention is equipped with a secondary air supply system 17 which is indicated in FIG. 1 by a dashed-line border. The secondary air supply system comprises a secondary air compressor 18 which, at a first connection point 19, branches off fresh air by way of a feed pipe 20 from the fresh-air pipe 5. This fresh air is compressed in the secondary air compressor 18, and is introduced by way of a secondary air pipe 21 upstream of the catalyst 15 into the exhaust pipe 13.

So that the internal-combustion engine 2, in particular, runs smoothly during its warm-up phase, it is operated in a rich manner during this warm-up or cold-start phase, so that the exhaust gases of the internal-combustion engine have unburnt CO- and CH-constituents. In order to reduce the pollutant emissions during this warm-up operation of the internal-combustion engine 2, fresh air, i.e., essentially $O_2$, is blown into the exhaust gases, by the secondary air supply system 17. Thereby, an afteroxidation or an afterburning of the unburnt fuel constituents contained in the exhaust gas takes place at the latest in the catalyst 15.

In the drive assembly 1 according to the invention, the secondary air supply system 17 is modified by constructively simple measures in order to be able to use the secondary air compressor 18 as an additional compressor for increasing the power of the internal-combustion engine 2 and improving the response action of the exhaust gas turbocharger 3 at lower rotational speeds. On one hand, a return pipe 22 is connected to the secondary air pipe 21 behind the secondary air compressor used as the additional compressor 18. The return pipe 22 leads into the fresh air pipe 5 at a second connection point 23. On the other hand, a switchable valve 24 is arranged in the secondary air pipe 21. The valve 24 opens or closes the air feeding through the secondary air pipe 21 to the exhaust pipe 13 depending on the switching position of the valve 24. In addition, a non-return valve 25 is arranged between the connection points 19, 23 in the fresh-air pipe 5, through which the flow takes place in the direction of the compressor 4. The non-return valve 25 has a shut-off effect in the opposite direction.

In order to increase the power or the torque of the internal-combustion engine 2 at low rotational speeds, the valve 24 is closed and the additional compressor 18 is activated. In the process, the fresh air taken in from the ambient environment 6 by way of the feed pipe 20 is compressed and is introduced by way of the return pipe 22 into the fresh-air pipe 5, from where it arrives in the compressor 4. Also at low rotational speeds, the compressor 4 of the turbocharger 3 develops a certain compression performance which has a multiplicative effect on the air pressure of the air fed to the compressor 4. In this manner, also a low pressure increase, which is caused by the secondary air compressor 18 originally not provided for this purpose, is clearly intensified.

In an air-guided Otto engine, the rate of air flow increased in this manner results in a corresponding increase of the fuel quantity. The exhaust gas which then flows out of the internal-combustion engine 2 has an increased enthalpy which is converted into driving power for the compressor 4 in the turbine 12. The increased driving power at the compressor 4 causes an increased compression of the charge air. This feedback builds up rapidly so that the exhaust gas turbocharger 3 responds early and the desired power increase occurs already at relatively low rotational engine speeds at the internal-combustion engine 2.

In order to reduce the pollutant emission during a cold start, the valve 24 is opened up and the secondary air compressor 18 is activated. To prevent the secondary air from being fed to the combustion in the internal-combustion engine 2 by way of the return pipe 22, a throttling of the charge air takes place in the throttle valve 9. Thereby, the secondary air is introduced into the exhaust pipe 13 essentially by way of the secondary pipe 21 to causes the desired afterburning.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive assembly for a vehicle having an internal-combustion engine for delivering driving energy, comprising an exhaust gas turbocharger having a compressor, the turbine being drivable by exhaust gases of the internal-combustion engine and the compressor being drivable by the turbine, and an air guiding system configured to feed fresh air to the compressor in which the fresh air is compressed to form charge air and to guide the charge air from the compressor to the internal-combustion engine, and an additional compressor operatively arranged to generate compressed fresh air which, as a function of system requirements, is feedable to the air guiding system upstream of the internal-combustion engine, the additional compressor comprising an existing vehicle compressor provided for a purpose other than generating the compressed fresh air, wherein the internal-combustion engine is an Otto engine, an emission control system comprising a catalyst is arranged in an exhaust pipe downstream of a turbine of the exhaust gas turbocharger in an exhaust pipe, and a connectable secondary air supply system having a connectable secondary air compressor which, as a function of the system requirements, feeds fresh air via a secondary air pipe upstream of the catalyst to the exhaust gas pipe, the secondary air compressor being the additional compressor, and at least one valve device being operatively arranged to feed the compressed fresh air generated by the additional compressor as a function of the system requirements to the air guiding system or the exhaust pipe, and the drive assembly has a throttle valve in a charge air pipe guiding the charge air from the compressor to the internal-combustion engine, the at least one valve device being operatively arranged in the secondary air pipe, and the throttle valve is operative to throttle the charge air for supplying the catalyst with compressed fresh air.

2. The drive assembly according to claim 1, wherein the additional compressor is connected upstream of the compressor parallel to a fresh air pipe feeding the fresh air to the compressor, a feed pipe being connected to the fresh air pipe at a first connection point, which fresh air pipe feeds fresh air from the fresh air pipe to the additional compressor downstream of the first connection point at a second connection point, a return pipe being connected to the fresh air pipe to introduce the compressed fresh air into the fresh air pipe, and a non-return valve being arranged in the fresh air pipe between the connection points to shut off the return flow from the second connection point to the first connection point through the fresh air pipe.

3. The drive assembly according to claim 2, wherein the internal-combustion engine is an Otto engine, an emission control system comprising a catalyst is arranged in an exhaust pipe downstream of a turbine of the exhaust gas turbocharger, and a connectable secondary air supply system having a connectable secondary air compressor which, as a function of the system requirements, feeds fresh air via a secondary air pipe upstream of the catalyst to the exhaust gas pipe, the secondary air compressor being the additional compressor, and valve devices being operatively arranged to feed the compressed fresh air generated by the additional compressor as a function of the system requirements to the air guiding system or the exhaust pipe.

4. The drive assembly according to claim 1, wherein the additional compressor is connected upstream of the compressor parallel to a fresh air pipe feeding the fresh air to the compressor, a feed pipe being connected to the fresh air pipe at a first connection point, which fresh air pipe feeds fresh air from the fresh air pipe to the additional compressor downstream of the first connection point at a second connection point, a return pipe being connected to the fresh air pipe to introduce the compressed fresh air into the fresh air pipe, and a non-return valve being arranged in the fresh air pipe between the connection points to shut off the return flow from the second connection point to the first connection point through the fresh air pipe.

5. The drive assembly according to claim 1, wherein the drive assembly is configured to determine a fuel quantity fed to the internal-combustion engine as a function of an air quantity fed to the internal-combustion engine measured by an air measuring element, and the compressed fresh air generated by the additional compressor is introduced upstream of the air measuring element into the air guiding system.

6. The drive assembly according to claim 5, wherein the internal-combustion engine is an Otto engine, an emission control system comprising a catalyst is arranged in an exhaust downstream of a turbine of the exhaust gas turbocharger, and a connectable secondary air supply system having a connectable secondary air compressor which, as a function of the system requirements, feeds fresh air via a secondary air pipe upstream of the catalyst to the exhaust gas pipe, the secondary air compressor being the additional compressor, and valve devices being operatively arranged to feed the compressed fresh air generated by the additional compressor as a function of the system requirements to the air guiding system or the exhaust pipe.

7. The drive assembly according to claim 6, wherein the additional compressor is connected upstream of the compressor parallel to a fresh air pipe feeding the fresh air to the compressor, a feed pipe being connected to the fresh air pipe at a first connection point, which fresh air pipe feeds fresh air from the fresh air pipe to the additional compressor downstream of the first connection point at a second connection point, a return pipe being connected to the fresh air pipe to introduce the compressed fresh air into the fresh air pipe, and a non-return valve being arranged in the fresh air pipe between the connection points to shut off the return flow from the second connection point to the first connection point through the fresh air pipe.

8. The drive assembly according to claim 7, wherein the drive assembly has a throttle valve in a charge air pipe guiding the charge air from the compressor to the internal-combustion engine, the valve devices are operatively arranged in the secondary air pipe, and the throttle valve is operative to throttle the charge air for supplying the catalyst with compressed fresh air.

9. The drive assembly according to claim 1, wherein the compressed fresh air generated by the additional compressor is introducible upstream of the compressor into the air guiding system.

10. The drive assembly according to claim 9, wherein the internal-combustion engine is an Otto engine, an emission control system comprising a catalyst is arranged in an exhaust pipe downstream of a turbine of the exhaust gas turbocharger, and a connectable secondary air supply system having a connectable secondary air compressor which, as a function of the system requirements, feeds fresh air via a secondary air pipe upstream of the catalyst to the exhaust gas pipe, the secondary air compressor being the additional compressor, and valve devices being operatively arranged to feed the compressed fresh air generated by the additional compressor as a function of the system requirements to the air guiding system or the exhaust pipe.

11. The drive assembly according to claim 10, wherein the additional compressor is connected upstream of the compressor parallel to a fresh air pipe feeding the fresh air to the compressor, a feed pipe being connected to the fresh air pipe at a first connection point, which fresh air pipe feeds fresh air from the fresh air pipe to the additional compressor downstream of the first connection point at a second connection point, a return pipe being connected to the fresh air pipe to introduce the compressed fresh air into the fresh air pipe, and a non-return valve being arranged in the fresh air pipe between the connection points to shut off the return flow from the second connection point to the first connection point through the fresh air pipe.

12. The drive assembly according to claim 11, wherein the drive assembly has a throttle valve in a charge air pipe guiding the charge air from the compressor to the internal-combustion engine, the valve devices are operatively arranged in the secondary air pipe, and the throttle valve is operative to throttle the charge air for supplying the catalyst with compressed fresh air.

13. The drive assembly according to claim 1, wherein with the at least one valve device closed and the additional compressor activated, a feed pipe is arranged to take in fresh ambient air and feed the same to the additional compressor, and a return pipe is operatively arranged to introduce the fresh ambient air from the additional compressor into a fresh-sir pipe of the air guiding system for being supplied to the exhaust gas turbocharger compressor; and, with the at least one valve device closed and the additional compressor activated, the throttle valve being operable to throttle the charge air to prevent the secondary air from being fed to the internal combustion engine and to cause the secondary air to be fed to the exhaust pipe.

14. A drive assembly for a vehicle having an internal-combustion engine for delivering driving energy, comprising an exhaust gas turbocharger having a compressor, the turbine being drivable by exhaust gases of the internal-combustion engine and the compressor being drivable by the turbine, and an air guiding system configured to feed fresh air to the compressor in which the fresh air is compressed to form charge air and to guide the charge air from the compressor to the internal-combustion engine, and an additional compressor operatively arranged to generate compressed fresh air which, as a function of system requirements, is feedable to the air guiding system upstream of the internal-combustion engine, the additional compressor comprising an existing vehicle compressor provided for a purpose other than generating the compressed fresh air, wherein the compressed fresh air generated by the additional compressor is feedable to the air guiding system at full load and in a low rotational speed range of the internal-combustion engine.

15. The drive assembly according to claim 14, wherein the internal-combustion engine is an Otto engine, an emission control system comprising a catalyst is arranged in an exhaust pipe downstream of the turbine of the exhaust gas turbocharger, and a connectable secondary air supply system having a connectable secondary air compressor which, as a function of the system requirements, feeds fresh air via a secondary air pipe upstream of the catalyst to the exhaust gas pipe, the secondary air compressor being the additional compressor, and valve devices being operatively arranged to feed the compressed fresh air generated by the additional compressor as a function of the system requirements to the air guiding system or the exhaust pipe.

16. The drive assembly according to claim 15, wherein the additional compressor is connected upstream of the compressor parallel to a fresh air pipe feeding the fresh air to the compressor, a feed pipe being connected to the fresh air pipe at a first connection point, which fresh air pipe feeds fresh air from the fresh air pipe to the additional compressor downstream of the first connection point at a second connection point, a return pipe being connected to the fresh air pipe to introduce the compressed fresh air into the fresh air pipe, and a non-return valve being arranged in the fresh air pipe between the connection points to shut off the return flow from the second connection point to the first connection point through the fresh air pipe.

17. The drive assembly according to claim 1, wherein the additional compressor is arranged to load a fresh-air storage device and the compressed fresh air generated by the additional compressor is feedable, as a function of the system requirements, from the fresh air storage device to the air guiding system.

18. The drive assembly according to claim 17, wherein the internal-combustion engine is an Otto engine, an emission control system comprising a catalyst is arranged in an exhaust pipe downstream of a turbine of the exhaust gas turbocharger, and a connectable secondary air supply system having a connectable secondary air compressor which, as a function of the system requirements, feeds fresh air via a secondary air pipe upstream of the catalyst to the exhaust gas pipe, the secondary air compressor being the additional compressor, and valve devices being operatively arranged to feed the compressed fresh air generated by the additional compressor as a function of the system requirements to the air guiding system or the exhaust pipe.

19. The drive assembly according to claim 18, wherein the additional compressor is connected upstream of the compressor parallel to a fresh air pipe feeding the fresh air to the compressor, a feed pipe being connected to the fresh air pipe at a first connection point, which fresh air pipe feeds fresh air from the fresh air pipe to the additional compressor downstream of the first connection point at a second connection point, a return pipe being connected to the fresh air pipe to introduce the compressed fresh air into the fresh air pipe, and a non return valve being arranged in the fresh air pipe between the connection points to shut off the return flow from the second connection point to the first connection point through the fresh air pipe.

* * * * *